UNITED STATES PATENT OFFICE.

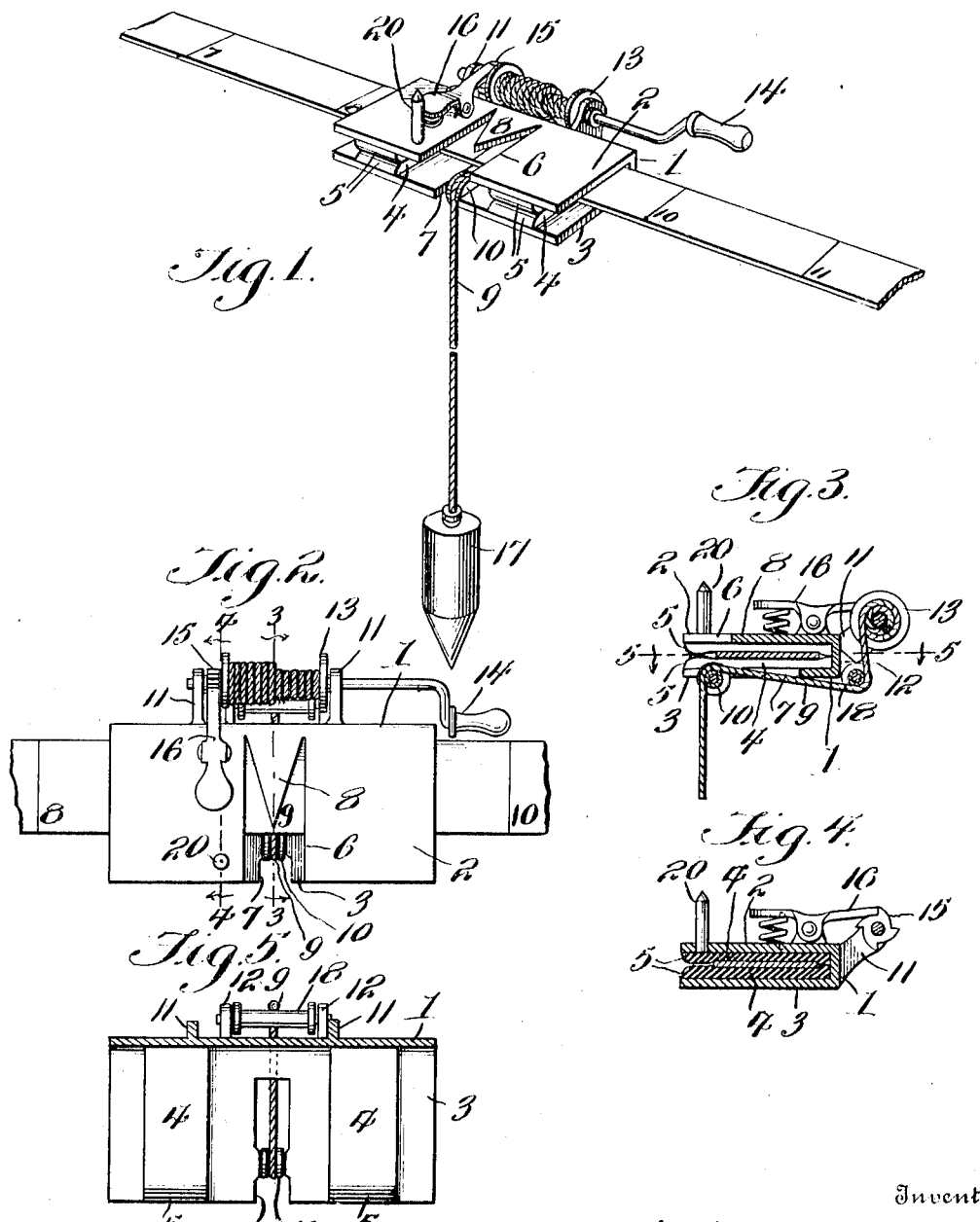

WILLIAM B. HONEY, OF MOUNT RAINIER, MARYLAND, ASSIGNOR OF ONE-FOURTH TO ELLIS F. WILSON AND ONE-FOURTH TO STELLA M. WILSON, BOTH OF WASHINGTON, DISTRICT OF COLUMBIA.

PLUMB-BOB SUPPORT.

1,080,448.     Specification of Letters Patent.     Patented Dec. 2, 1913.

Application filed April 2, 1912. Serial No. 688,002.

*To all whom it may concern:*

Be it known that I, WILLIAM B. HONEY, a citizen of the United States, residing at Mount Rainier, in the county of Prince Georges and State of Maryland, have invented new and useful Improvements in Plumb-Bob Supports, of which the following is a specification.

This invention relates to plumb bob supports and more particularly to that type which are adapted for use in connection with surveyors' measuring tapes.

One of the principal objects of the invention is to provide a simple and efficient device upon which a plumb bob may be adjustably supported and which may be moved over a surveyor's tape and which embodies a sighting pin constantly in line with the plumb bob cord or cable.

Further objects of this invention will appear as the following specific description is read in connection with the accompanying drawing, which forms a part of this application, and in which:—

Figure 1 is a perspective view. Fig. 2 is a top plan view on an enlarged scale. Fig. 3 is a transverse section on the line 3—3 of Fig. 2. Fig. 4 is a similar section on the line 4—4 of Fig. 2. Fig. 5 is a horizontal section taken on the line 5—5 of Fig. 3.

Referring more particularly to the drawing, the body of the device comprises a U-shaped member 1 having parallel sides or legs 2 and 3. These legs are separated a sufficient distance to receive friction pads 4 which extend across the legs or sides and are cut away at their forward edges, as shown at 5, so as to present a flaring entrance opening which permits the ready insertion of the tape between said friction members. These members are preferably constructed of rubber or other similar material so as to hold the device firmly against accidental movement of the tape. The side plates 2 and 3 are provided with notches 6 and 7, the former of which provides a sight opening and projecting into the sight opening is a pointer 8 which is adapted to operate over the graduations on the tape. The notch 7 is provided to permit the passage of the plumb bob cord or cable 9 and has journaled between its sides a grooved pulley 10 whose groove is alined across the body with the pointer 8.

Projecting outwardly from the rear of the device are separate pairs of ears 11 and 12. Journaled in the ears 11 is a winding drum 13 having an operating handle 14 projecting from the end of its shaft and being also provided with a ratchet wheel 15 which is engaged by the spring actuated pawl 16. Around this drum is wound the cable or cord 9 to which the plumb bob 17 is attached. The cable or cord passes from around the drum 13 over a guiding roller 18 which is journaled in the ears 12, as shown in Fig. 3. Projecting vertically from the side 2 is a sighting pin 20 which is alined longitudinally with the plumb bob cord or cable in a line parallel with the tape after the cord has passed over the pulley 10.

In the operation of the device, the body is moved along the tape until the pointer is over the proper graduation thereon at which time the operator depresses the thumb end of the pawl 16 against the tension of the spring, thereby releasing the same from the ratchet wheel 15 and permitting the plumb bob line to unwind from the reel and the plumb bob to strike the ground at a point exactly below the graduations in a vertical line. The sighting pin and plumb bob cord being in a common vertical plane with the longitudinal line through the tape, the instrument man can take a sight on the pin and get much better results than by sighting the plumb bob cord itself, which, under the most favorable circumstances, is generally swaying from or suspended near the ground at least two-tenths of an inch on either side of the vertical line.

In this device, the plumb bob is wound up close to the under side of the device and has very little chance for oscillation and when released, travels in a straight line to the earth, thus marking the point directly beneath the graduation and in line with the sighting pin.

What is claimed is:—

A device of the class described comprising a support adapted to be slidably mounted upon a tape, a plumb bob line reel carried by the support, a plumb bob line wound upon the reel, releasable means for holding the reel in wound position, a guiding member for the line and a sighting pin carried on the support and arranged in the same vertical plane with said line after the line passes over the guiding member said plane being parallel with a line drawn longitudinally through the tape.

In testimony whereof I affix my signature in presence of two witnesses.

WILLIAM B. HONEY.

Witnesses:
 STELLA M. WILSON,
 ELLIS F. WILSON.